United States Patent
Pleis et al.

(10) Patent No.: US 7,287,112 B1
(45) Date of Patent: Oct. 23, 2007

(54) DYNAMIC RECONFIGURATION INTERRUPT SYSTEM AND METHOD

(75) Inventors: Matthew A. Pleis, Carnation, WA (US); Kenneth Y. Ogami, Bothell, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 549 days.

(21) Appl. No.: 10/327,207

(22) Filed: Dec. 20, 2002

Related U.S. Application Data

(63) Continuation-in-part of application No. 09/989,817, filed on Nov. 19, 2001, now Pat. No. 6,971,004, and a continuation-in-part of application No. 10/256,829, filed on Sep. 27, 2002.

(51) Int. Cl.
*G06F 13/24* (2006.01)
(52) U.S. Cl. ...................... 710/269; 710/266
(58) Field of Classification Search ............. 710/62, 710/8, 104
See application file for complete search history.

(56) References Cited

U.S. PATENT DOCUMENTS

| | | | | |
|---|---|---|---|---|
| 4,604,363 A * | 8/1986 | Newhouse et al. | ......... | 436/177 |
| 4,876,466 A * | 10/1989 | Kondou et al. | ................ | 326/38 |
| 4,879,688 A * | 11/1989 | Turner et al. | .......... | 365/185.22 |
| 5,341,044 A * | 8/1994 | Ahanin et al. | ................. | 326/41 |
| 5,426,378 A * | 6/1995 | Ong | ............................ | 326/39 |
| 5,453,904 A * | 9/1995 | Higashiyama et al. | ........ | 361/94 |
| 5,563,526 A * | 10/1996 | Hastings et al. | .............. | 326/37 |
| 5,687,325 A * | 11/1997 | Chang | ......................... | 710/104 |
| 5,703,871 A * | 12/1997 | Pope et al. | ................. | 370/248 |
| 5,721,931 A * | 2/1998 | Gephardt et al. | ........... | 710/260 |
| 6,304,101 B1* | 10/2001 | Nishihara | .................... | 326/41 |
| 6,460,172 B1 | 10/2002 | Insenser Farre et al. | ...... | 716/17 |
| 6,542,844 B1 | 4/2003 | Hanna | | |
| 6,661,724 B1 | 12/2003 | Snyder et al. | | |
| 6,724,220 B1* | 4/2004 | Snyder et al. | ................. | 326/39 |
| 6,898,703 B1* | 5/2005 | Ogami et al. | .................. | 713/2 |
| 6,971,004 B1* | 11/2005 | Pleis et al. | ................... | 713/100 |
| 2004/0018711 A1* | 1/2004 | Madurawe | .................. | 438/598 |

OTHER PUBLICATIONS

Mooris Mano, "Computer System Architecture", 1982, Prentice-Hall, Inc., 2nd Ed., pp. 261-264 and 435-440.*
Kirk Killat, "A One-Chip Solution for Electronic Ballasts in Fluorescent Lamps", Power Electronics, http://powerelectronics.com/mag/power_onechip_solution_electronic/.*
Fred Eady, "PSoC 101", Circuit Cellar, http:// www. circuitcellar.com/library/print/0804/eady169/2.htm.*

* cited by examiner

*Primary Examiner*—Khanh Dang

(57) ABSTRACT

The present invention system and method enables dynamic reconfiguration of an electronic device with appropriate interrupts in a convenient and efficient manner. A plurality of internal peripherals, an interconnecting component and the external coupling ports are programmably configurable to perform a variety of functions with different interrupts. In response to interrupt request names that are utilized in multiple configurations, an interrupt dispatcher component directs operations to an appropriate interrupt handler for a particular configuration based upon both the configuration image and the interrupt service request indicator. The electronic device can be automatically reconfigured based upon the existence of a predetermined condition by activating different configuration images and associated interrupts are automatically included. Pending interrupt state indicators are resolved (e.g., deleted) during the reconfiguration.

9 Claims, 7 Drawing Sheets

290

| INTERRUPT REQUEST IDENTIFIER 291 | INTERRUPT RESOLUTION INDICATOR 292 |
|---|---|
| IRQ1 (USED IN MULTIPLE CONFIGURATIONS) | INTERRUPT DISPATCHER 293 |
| IRQ2 (USED IN MULTIPLE CONFIGURATIONS) | INTERRUPT DISPATCHER 294 |
| IRQ3 (USED IN SINGLE CONFIGURATIONS) | INTERRUPT HANDLER 295 |
| IRQ4 (USED IN SINGLE CONFIGURATIONS) | INTERRUPT HANDLER 297 |

FIGURE 2C

DYNAMIC RECONFIGURATION INTERRUPT SYSTEM AND METHOD

RELATED APPLICATIONS

This application is a Continuation in Part and claims the benefit of commonly assigned U.S. patent application Ser. No. 09/989,817, filed Nov. 19, 2001 now U.S. Pat. No. 6,971,004, entitled "SYSTEM AND METHOD OF DYNAMICALLY RECONFIGURING A PROGRAMMABLE INTEGRATED CIRCUIT," and U.S. patent application Ser. No. 10/256,829, filed Sep. 27, 2002, entitled "GRAPHICAL USER INTERFACE FOR DYNAMICALLY RECONFIGURING A PROGRAMMABLE DEVICE," by Matthew A. Pleis et al., which are both incorporated herein by this reference.

FIELD OF THE INVENTION

Embodiments of the present invention generally relate to the field of integrated circuit chips. More specifically, embodiments of the present invention pertain to a system and method for dynamically reconfiguring a programmable integrated circuit or electronic device.

BACKGROUND

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Electronic systems designed to provide these benefits often include integrated circuits on a single substrate that provide a variety advantages over discrete component circuits. However, traditional design and manufacturing approaches for integrated circuits are often very complex and consume significant resources.

Electronic systems often rely upon a variety of components included in integrated circuits to provide numerous functions. Microcontrollers are one example of integrated circuit components with characteristics that are potentially useful in a variety of applications. For example, microcontrollers are typically reliable and relatively economical to produce. Microcontrollers have evolved since they were first introduced and have substantially replaced mechanical and electromechanical components in numerous applications and devices. However, while traditional microcontrollers have some characteristics that are advantageous they also tend to be limited in the number of applications in which any given microcontroller can be utilized.

Traditionally each microcontroller was custom designed precisely for a narrow range of applications with a fixed combination of required peripheral functionalities. Developing custom microcontroller designs with particular fixed peripherals is time and resource intensive, typically requiring separate and dedicated manufacturing operations for each different microcontroller (which is particularly expensive for small volume batches). Even if a microcontroller may suffice for more than one application, it is still difficult to select an appropriate microcontroller for a particular application and even harder to find an optimum microcontroller, usually necessitating a compromise in the selection.

Application specific integrated circuits (ASICs) may appear to address some of the issues associated with finding a suitable microcontroller for a particular application, but they tend to present significant hurdles. ASICs can be problematic because they tend to require a sophisticated amount of design expertise and the obstacles of long development times, high costs, and large volume requirements still remain. In addition traditional integrated circuit configurations and functionality are typically set during initial manufacture and are not readily adaptable to changing conditions in the field. Most applications require the performance of a variety of different functions resulting in significantly increased resource commitments. Providing components dedicated to single functions often results in under utilization of those dedicated components.

It is also very important for microcontrollers to have appropriate interrupt handling capabilities. Interrupts are usually changes in flow of control caused by something other than a running program. Interrupts typically involve important and often critical operations, such as an input/output interrupt request or an error non maskable interrupt. If the interrupt is inappropriate for a particular configuration or functionality and/or not handled correctly, a system will likely produce erroneous results and/or crash. Another important aspect of interrupt handling is for the interrupt handling to be transparent. When a microcontroller stops processing a particular program to handle an interrupt, it is important for the microcontroller to be returned to a state that permits the microcontroller to appropriately continue with the particular programming.

SUMMARY

The present invention is a system and method that provide interrupt capabilities in a dynamically programmable electronic device (e.g., a programmable integrated circuit) in a convenient and efficient manner. In one embodiment of the present invention, the appropriate interrupt handling enables operationally smooth (e.g., "on the fly") changes in the configuration and/or functionality of the electronic device with minimal or no disruptions to device operations. In one exemplary embodiment, the present invention is implemented in an integrated microcontroller with components that are dynamically programmable to provide different interrupt service routings for various configurations and functions. A plurality of different configuration images are utilized to define the different configurations and functions and facilitate allocation of programmable components included in the electronic device accordingly.

In one embodiment, the present invention is implemented in a microcontroller included on a single substrate. The microcontroller includes a microprocessor, a plurality of internal peripherals, an interconnecting component, an external coupling port, and memories for storing instructions and data. The microprocessor processes information. The plurality of internal peripherals are programmably configurable to perform a variety of functions associated with the microcontroller, including various interrupt service routines. The memory stores instructions and data (e.g., a configuration image) directed at setting the configurations and functions allocated to the plurality of internal peripherals, the interconnecting component and the external coupling port. In one embodiment, an interrupt vector table that provides an association between interrupt request names and interrupt resolution indications corresponding to interrupt dispatcher components. The interrupt dispatcher component directs operations to an appropriate interrupt handler for a particular configuration based upon both the configuration image and the interrupt service request indicator. In one exemplary implementation the memory stores a plurality of configuration images and interrupt service routine information associated with each of said plurality of configuration images, wherein the configuration images define the configuration and functionality of the circuit.

In one embodiment, a plurality of configuration images facilitate dynamic reconfiguration of a programmable integrated circuit (e.g., a PSOC microcontroller, available from Cypress MicroSystems, Inc, Bothell, Wash.). For example, a programmable integrated circuit can be automatically reconfigured based upon the existence of a predetermined condition by activating different configuration images. When a configuration change occurs a corresponding interrupt scheme appropriate for the configuration is implemented. In one exemplary implementation of an interrupt scheme change, an interrupt request name or indicator (e.g., IRQ2) can be directed towards a transmission process in accordance with a first interrupt scheme (e.g., in a first configuration) and then the same interrupt request name or indicator (e.g., IRQ2) can be directed toward a receiving process in a second interrupt scheme (e.g., in a second configuration). In one embodiment, a dispatching component directs operations to interrupt service request indicators that are utilized in multiple configurations to the correct interrupt handler for the particular active configuration. The present invention can also ensure that when a reconfiguration occurs that pending interrupt status indicators are resolved (e.g., deleted).

DRAWINGS

FIG. 2C is an illustration of an exemplary interrupt vector table included in one embodiment of the present invention.

DETAILED DESCRIPTION OF THE INVENTION

Figure 1:
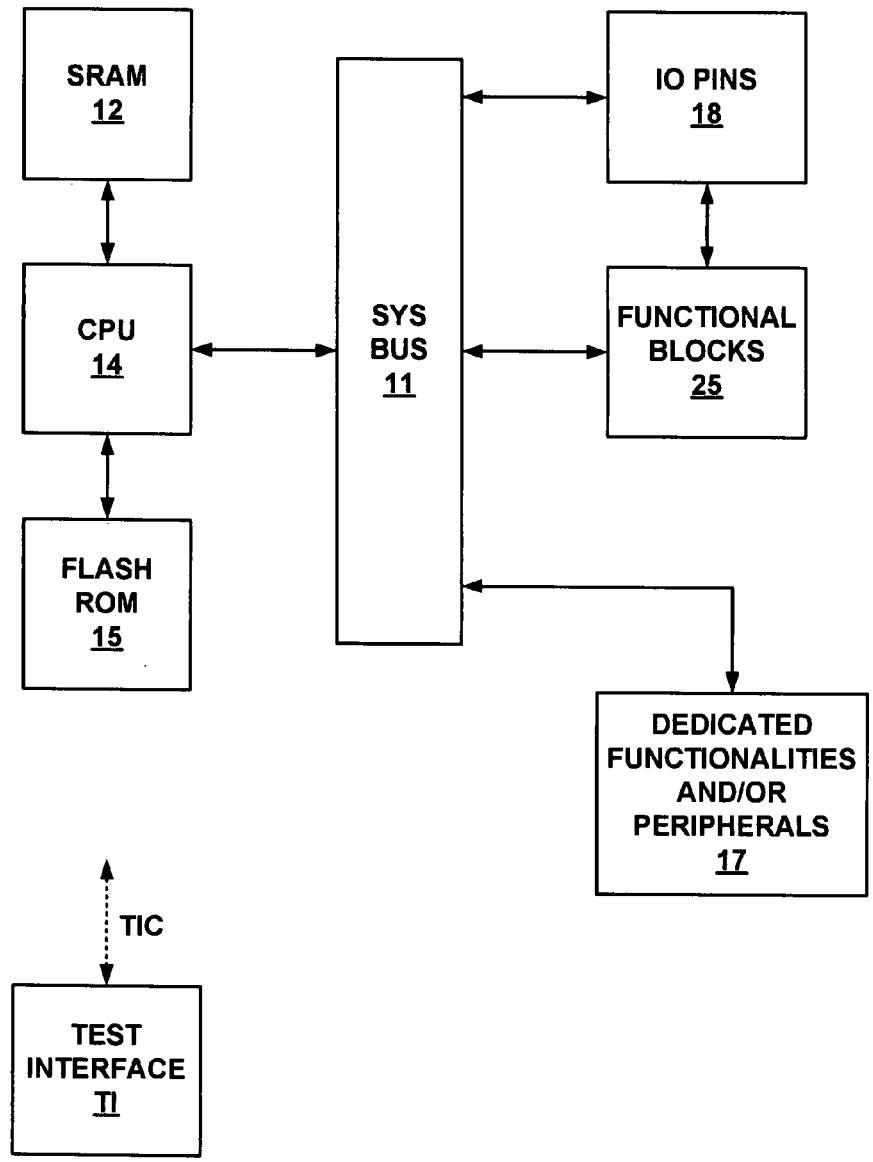
FIG. 1 is a block diagram showing a high level view of an exemplary integrated circuit (e.g., a microcontroller) upon which embodiments of the present invention may be implemented.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The present invention is a system and method of dynamically reconfiguring interrupts for an electronic device. In one embodiment of the present invention, interrupts for a system integrated on a single substrate are dynamically reconfigured to correspond to a plurality of configuration and functionality changes in the system. In one exemplary implementation of the present invention, a plurality of interrupt schemes associated with a plurality of configuration images defining different configurations and functionalities of a programmable electronic device are stored in a memory included in the programmable electronic device. The interrupt and configuration image data may be generated and loaded on the programmable electronic device in various manners including by an electronic device design tool. In one embodiment, the electronic device design tool comprises a configuration interface for defining user module personalization and parameterization, an automated code generator for generating source code (e.g., application program interface code), a source code editing interface for editing the automatically generated code, and a debugging interface for assisting debugging operations through emulation of the target device. The exemplary embodiments described herein (e.g., a microcontroller) are not meant to limit the application of the present invention to any specific integrated circuit device or type (e.g., a microcontroller) and embodiments of the present invention may be implemented in a variety of integrated circuits.

FIG. 1 is a block diagram showing a high level view of an exemplary integrated circuit (e.g., a microcontroller) 10 upon which embodiments of the present invention may be implemented. In one embodiment, integrated circuit 10 includes a communication bus 11, static random access memory (SRAM) 12, central processing unit (CPU) 14, flash read-only memory (ROM) 15, input/output (I/O) pin(s) 18 and functional component 25. Communication bus 11 is electrically coupled to static random access memory (SRAM) 12, central processing unit (CPU) 14, flash read-only memory (ROM) 15, input/output (I/O) pin(s) 18 and functional component 25. Static random access memory (SRAM) 12 stores volatile or temporary data during firmware execution including interrupt configuration states. Central processing unit (CPU) 14 processes information and instructions. Flash read-only memory (ROM) 15 stores information and instructions (e.g., firmware) including a plurality of interrupt service routines or interrupt handlers associated with said functions and configurations. Flash ROM 15 also stores instructions on dispatching operations to an appropriate interrupt handler for each configuration. In one embodiment of the present invention, flash read-only memory (ROM) 15 stores configuration image data. Input/output (I/O) pin(s) 18 provides an interface with external devices (not shown). Functional component 25 is programmable to provide different functions and configurations.

It is appreciated that integrated circuit 10 is readily adaptable to include a variety of other components. In one exemplary implementation, integrated circuit 10 also includes a dedicated functionality internal peripheral component 17 which is coupled to system bus 11 in addition to the programmable system on a chip functional component 25. An optional test interface (TI) may be coupled to integrated circuit 10 via a test interface coupler (TIC), which may be detachable, to perform debugging operations during startup and initialization of the integrated circuit. In one embodiment of the present invention, additional functions such as clocking and power control are provided by a variety of components including a precision oscillator and phase locked loop (PLL), a voltage reference, a 32 kHz crystal oscillator (which may be utilized for a variety of applications such as calibration and synchronization, etc.), an interrupt controller (for generating interrupt signals as required), a power on reset control unit (for performing functions related to power supply stability), and a brown-out detection unit (which detects substandard, subnominal power system parameters).

Figure 2A:
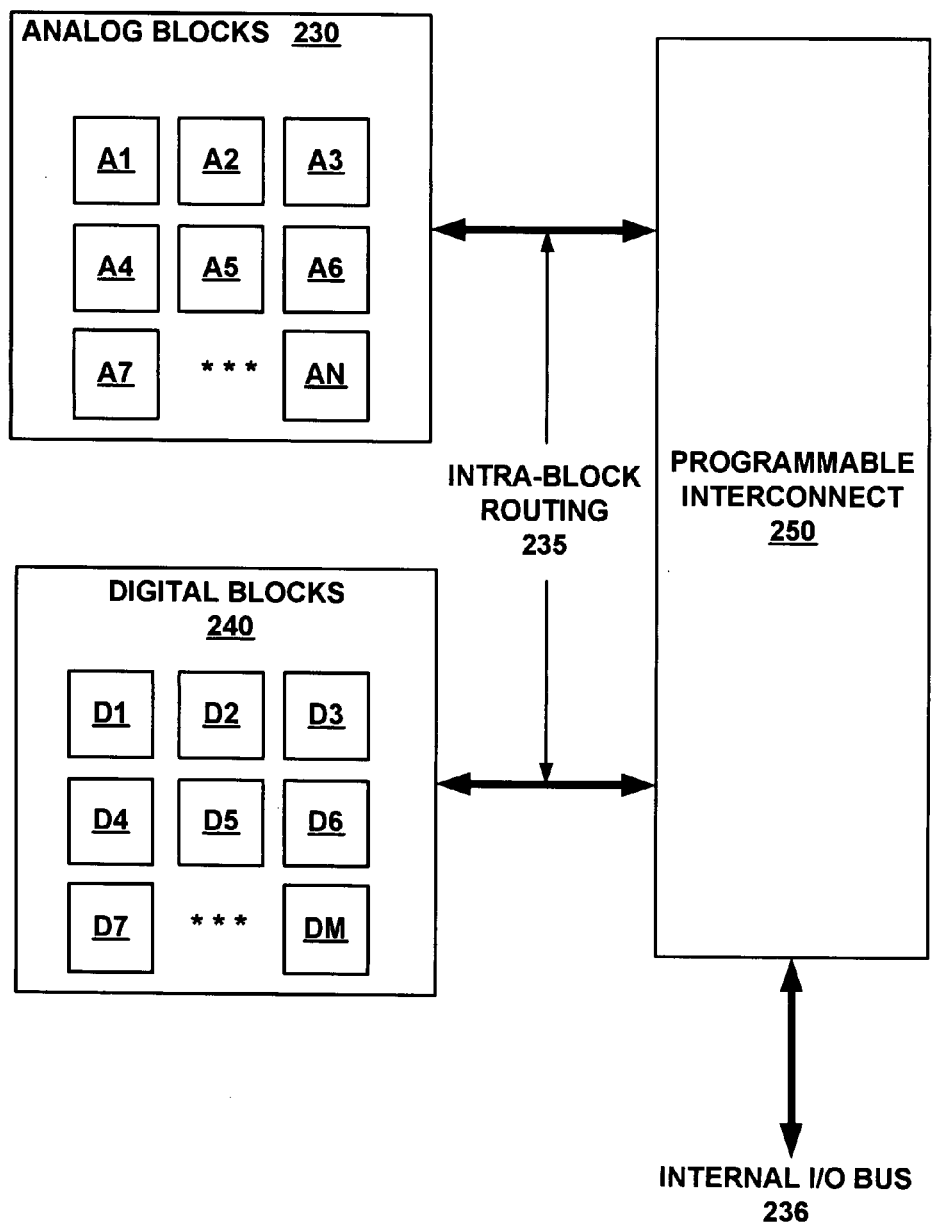
FIG. 2A is a block diagram of one embodiment of a functional component depicted in greater detail.

Referring to FIG. 2A, an embodiment of functional component 25 is depicted in greater detail. In this embodiment, functional component 25 includes an analog functional block 230, a digital functional block 240, and a programmable interconnect 250. In one exemplary implementation, analog functional block 230 includes a matrix of interconnected analog functional blocks A1 through AN. The number N may be any number of analog functional blocks. Likewise, digital block 240 includes a matrix of interconnected digital functional blocks D1 through DM. The number M may be any number of digital functional blocks.

The analog functional blocks A1 through AN and the digital functional blocks D1 through DM are fundamental building blocks (e.g., fundamental circuits) that may be combined in a variety of configurations to accomplish a variety of functions. The functional blocks are programmably configurable to perform different functions. In the present embodiment, the functional blocks include elements with changeable characteristics that can be specified according to the function to be performed. Inputs received by a functional block are directed through and manipulated by the functional block according to the specified characteristics of the elements. A combination of functional blocks and the characteristics of their elements can be dynamically programmed to perform a desired function. Importantly, different combinations of blocks producing different functions with different interrupts, may exist at different times within the same system. For example, a set of functional blocks configured to perform the function of analog-to-digital conversion may sample a signal. After processing that signal in the digital domain, some or all of those same blocks (perhaps in conjunction with others) may be recombined in a different configuration to perform the function of digital-to-analog conversion to produce an output signal. During the recombination of those blocks the interrupt scheme may also be altered accordingly to provide appropriate handlers or interrupt service routines (ISRs) for the reconfigured system.

The present invention is readily adaptable for use with numerous functional blocks that are programmably configurable to provide a variety of functions. Exemplary functional peripherals include timers, controllers, serial communications units, Cycle Redundancy Check (CRC) generators, Universal Asynchronous Receiver/Transmitters (UARTs), amplifiers, programmable gain components, digital to analog converters, analog to digital converters, analog drivers, and various filters (e.g., high-, low-, and band-pass). In one exemplary implementation higher order user modules (e.g., modems, complex motor control, sensor devices, etc.) are created with combinations of functional blocks. Co-pending commonly-owned incorporated U.S. patent application Ser. No. 10/033,027, filed Oct. 22, 2001, entitled "PROGRAMMABLE MICROCONTROLLER ARCHITECTURE," includes additional details on exemplary implementations of present invention integrated circuits (e.g., integrated circuit 10) and functional components (e.g., functional component 25), which is incorporated herein by reference.

In one embodiment of the present invention, the programmable configuration of integrated circuit 10 components is facilitated by memory (e.g., configuration registers) included in the integrated circuit. In one exemplary implementation of the present invention, the memory includes configuration registers that store a series of logical values (e.g., logical 1 or 0 corresponding to a predetermined voltage level) corresponding to a particular configuration and/or function for an integrated circuit 10 functional block. The series of logic values are programmably configurable and in one embodiment of the present invention the logical values loaded in a configuration register are defined by a configuration image (e.g., stored in a system memory 15).

In one embodiment of the present invention, a functional component (e.g., functional component 25) includes registers that are programmably configurable to store configuration data that defines the combination (e.g., electrical coupling) of the functional blocks and the characteristics (e.g., parameters) of the respective functional block elements. When a value is changed in a configuration register, the configuration and/or functionality of a corresponding integrated system 10 component is changed accordingly. In one exemplary implementation of the present invention, some functional blocks are configured to affect autonomous system operations, such as interrupts.

Figure 2B:
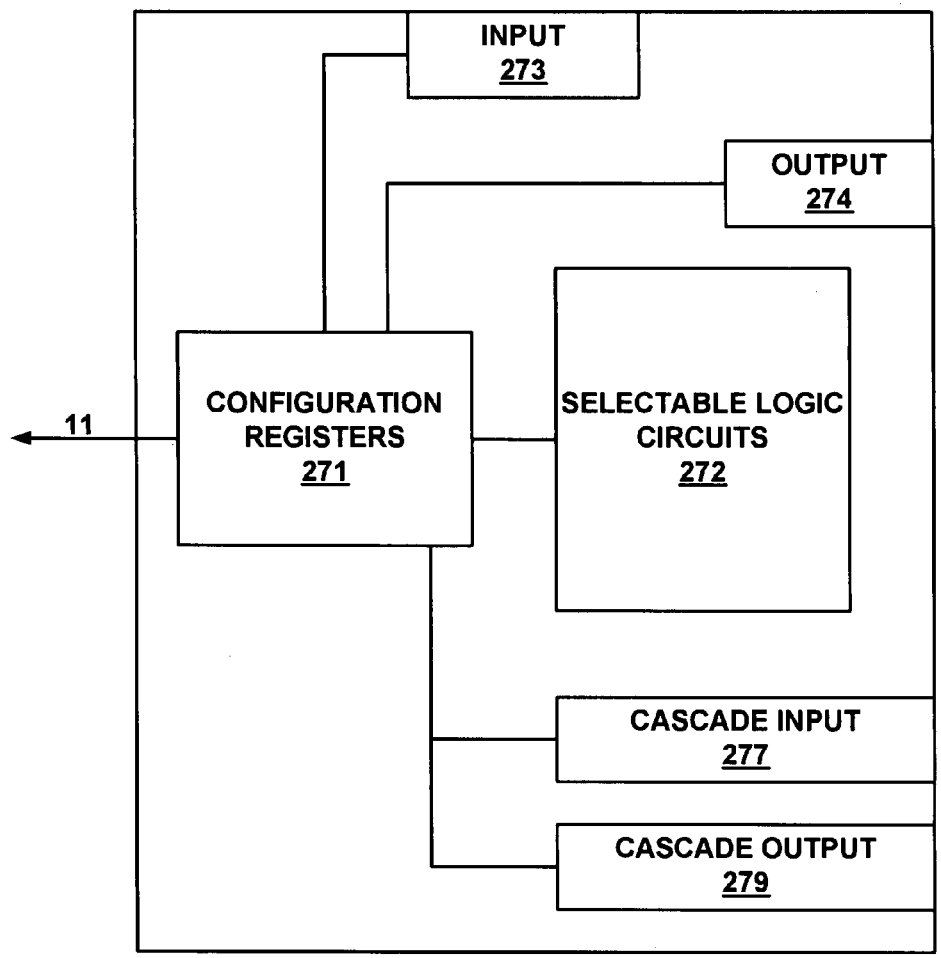
FIG. 2B is a block diagram of one embodiment of a functional block, included in one exemplary implementation of a present invention functional block.

FIG. 2B is a block diagram of functional block 270, one embodiment of a present invention functional block (e.g., A1, D1, etc.). Functional block 270 comprises configuration register(s) 271, selectable logic circuits 272, input 273, output 274, cascade input 277, and cascade output 279. Configuration register(s) 271 is coupled to selectable logic circuits 272, input 273, output 274, cascade input 277, and cascade output 279. Configuration register(s) 271 stores configuration data that defines the configuration and functionality of the other components of functional block 270. Selectable logic circuits 272 are circuit components that provide a variety of functions in accordance with the configuration data stored in configuration register(s) 271. Input 273 and output 274 provide inputs and outputs respectively to other components of integrated circuit 10 in accordance with the configuration data stored in configuration register(s) 271. Cascade input 277 and cascade output 279 provide inputs and outputs respectively to other cascaded functional blocks in accordance with the configuration data stored in configuration register(s) 271. In one embodiment there are four configuration registers per block, with a capacity of eight bits per register.

A hierarchy of programmable interconnectivity is implemented within system 10. Continuing with reference to FIG. 2A, each individual functional block or unit (e.g., analog blocks A1 through AN and digital blocks D1 through DM) may communicate and interact with each and/or any other functional block or unit and/or communication bus 11. Analog functional blocks 230 and digital functional blocks 240 are communicatively coupled to programmable interconnect 250 by intra-block routing 235 in the present exemplary embodiment. Which functional unit communicates with which other functional unit and/or communication bus 11 is programmably configurable via the programmable interconnect 250 in the present exemplary embodiment. In one exemplary implementation of the present invention, analog functional blocks 230 and digital blocks 240 include internal matrices that facilitate coupling of signals between the function blocks in accordance with programmed configuration data.

In the present exemplary embodiment, programmable interconnect 250 comprises a configuration system and a global mapping system. The configuration system is coupled to communication bus 11 and the global mapping system, which in turn is coupled to functional component 25. The configuration system is programmably configurable to selectively couple with communication bus 11 and/or the global mapping system. The global mapping system facilitates selective coupling of functional blocks included in functional component 25 to other functional blocks and/or communication bus 11. In one exemplary implementation, the global mapping system includes an input global mapping component and an output global mapping component.

In one embodiment of the present invention, programmable interconnect 250 includes configuration registers. The values in the configuration registers are utilized to establish electrically conductive paths between components of integrated circuit 10. In one exemplary implementation of the present invention the configuration registers facilitate electrical coupling of functional blocks to each other and to other components of integrated circuit 10 (e.g., processor 14).

In one embodiment of the present invention, which functional block and/or other components of integrated system 10 are electrically coupled to an I/O pin is configurably programmable via programmable interconnect 250. In the present exemplary implementation, programmable interconnect 250 is connected via an internal input/output (I/O) bus 236 to a configurable I/O port (e.g., I/O pin(s) 18 in FIG. 1). Each pin of the configurable I/O port is programmably configured on a pin by pin basis. For example, in a first configuration a first I/O port pin (e.g., I/O pin(s) 18) is configured to function as an input and a second I/O pin is configured to function as an output, and in a second configuration the first I/O port pin is configured to function as an output and the second I/O pin is configured to function as an input. The total pin count of a pin-by-pin configurable I/O port (e.g., I/O pin(s) 18) may vary from one application to another, depending on the system device under consideration. An I/O routing modality incorporating features of the present embodiment enables configurable I/O ports to establish a specific pin locale or pin for the conveyance of particular external signals (e.g., to or from an external device) on pin by pin basis, greatly enhancing user convenience and system applicability.

In one embodiment of the present invention, a system timing block is included to provide timing information used for synchronizing and otherwise effectuating interfacing between system functionalities (e.g., functional blocks). The system timing block like the functional component 25 is programmable. Advantageously, this allows the system timing block to generate a myriad of different time bases, as required for any particular application the system is being configured to effectuate. These time bases may be fed into analog functional blocks and digital functional blocks for use therein, via the programmable interconnect. Examples of analog functions requiring such time bases include conversions, modulations, and the like. One striking example of a digital function requiring such time bases is the universal asynchronous receiver transmitter (UART) functionality.

In one embodiment of the present invention, the configuration and functionality of an electronic device (e.g., a programmable integrated circuit component) is defined by a configuration image loaded in a memory of the electronic device (e.g., microcontroller 10). In one exemplary implementation of the present invention, a plurality of images and associated interrupt handlers are loaded in a memory of an electronic system to facilitate dynamic reconfiguration of the electronic system (e.g., a programmable integrated circuit or electronic device). The information comprising the configuration images and the interrupts may be represented in varying degrees of abstraction. At a low level of abstraction the configuration image is represented by source code (e.g., assembly or machine language) stored as logical values (e.g., logical ones and zeroes) in a memory (e.g., in the programmable integrated circuit or electronic device). At a higher lever of abstraction the configuration image is represented by textual definitions or graphical images (e.g., in a design tool).

In one exemplary implementation of the present invention, a configuration image includes user module personalization data (e.g., a configuration table), module parameterization data, application program interface (API) information and user program code. The user module personalization data includes information defining the functionality and configuration of a component included in a programmable electronic device (e.g., a functional block). The parameterization data defines parameters for the programmable electronic device component. The API defines an operation of the programmable electronic device component (e.g., apply power, remove power, sample rate of an analog to digital converter, etc.). In one embodiment of the present invention an API includes code for a function call (e.g., from a user program) and/or an interrupt handler. For example, the interrupt code can include operational instructions that are implemented (e.g., in response to assertion of an interrupt request). In one exemplary implementation of the present invention, user module personalization data defines an analog function block to function as an op amp, the parameterization data defines the gain of the op amp (e.g., 8×), and the API code defines a reset of the op amp.

A dynamically programmable electronic device (e.g., a programmable integrated circuit) of the present invention is programmably configurable to perform a plurality of functions with various interrupts for a variety of applications. Each configuration image and corresponding interrupts loaded in a present invention programmable electronic device enables the programmable electronic device to provide a different configuration and functionality. The system is automatically reconfigured by activating different ones of a plurality of configuration images and associated interrupt service routine handlers based upon the existence of a predetermined condition or event. In one embodiment, a first configuration image is automatically loaded into configuration registers in response to a first condition and the system is dynamically reconfigured by loading a second configuration into configuration registers in response to a second condition. For example, a present invention programmable electronic device is included in a wireless communication device (e.g., a walkie-talkie) in one implementation. When a transmission indication exists (e.g., a "talk" button is engaged) a first image loaded in the programmable electronic device is activated (e.g., configuration registers are loaded in accordance with the first image) causing the programmable electronic device components to perform as a transmitter and when a receiving indication exists (e.g., the talk button is not engaged) a second image loaded in the programmable electronic device is activated causing the programmable electronic device components to perform as a receiver.

In one embodiment of the present invention, a first configuration image is associated with functions directed at normal or standard activities of a particular application and a second configuration image is associated with functions directed at special activities of a particular application. For example, a present invention programmable electronic device can be included in a vending machine. During normal operating hours a first image loaded in the programmable electronic device can cause the programmable electronic device components to participate in normal vending operations (e.g., monitoring money collection, calculating change, controlling product dispensing, etc.) and for short durations at predetermined intervals a second image loaded in the programmable electronic device can cause the programmable electronic device components to participate in inventory activities (e.g., calculating the totals of products sold, determining need for additional products, participating in modem operations to communicate with a central resource, etc.).

When a configuration change occurs a corresponding interrupt scheme appropriate for the configuration is implemented. For example, each function or hardware configuration can have its own interrupt service routines ("interrupts"). In one exemplary implementation of an interrupt scheme change, an interrupt request name or indicator (e.g., IRQ2) can be directed towards a transmission process in accordance with a first interrupt scheme (e.g., in a first configuration) and then the same interrupt request name or indicator (e.g., IRQ2) can be directed toward a receiving process in a second interrupt scheme (e.g., in a second configuration). Thus, the present invention facilitates the dynamic reconfiguration definition or context of an interrupt request (e.g., IRQ1, IRQ2, IRQ3, etc.) to appropriately correspond with a change in the configuration or functionality of a chip. The present invention ensures that when the first configuration or functionality is changed to a second configuration or functionality the proper interrupt handlers or interrupt service routines are loaded.

In one embodiment, an interrupt vector table associates particular interrupt requests (e.g., IRQ1, IRQ2, etc.) with an interrupt resolution indication (e.g., interrupt handler or an interrupt dispatcher). The interrupt table can provide a priority ordering to the interrupt requests. For example, if a higher numbered interrupt request is received (e.g., IRQ1) it is handled (e.g., the ISR associated with IRQ1 is performed) before a lower numbered interrupt request (e.g., IRQ2, IRQ3, etc.). In one embodiment of the present invention the interrupt vector table is stored in a RAM.

FIG. 2C is an illustration of an exemplary interrupt vector table included in one embodiment of the present invention. In the first column 291 there are rows of interrupt request names (e.g., IRQ1, IRQ2, IRQ3, IRQ4, etc.). In the second column 292 there are interrupt resolution indications corresponding to an interrupt handler or interrupt dispatcher component (e.g., dispatcher indications 293 and 294 and interrupt handler indications 295 and 297). For example, an interrupt resolution indication can designate (e.g., provides the memory location) of either an interrupt handler or interrupt dispatcher component. If an interrupt request name or identifier is unique (e.g., is used in one configuration) the interrupt vector table provides a direct reference to the appropriate interrupt handler. If an interrupt request name or identifier is not unique (e.g., is used in multiple configurations) the interrupt vector table provides a reference to an interrupt dispatcher which in turn provides a reference to the appropriate interrupt handler for a particular configuration.

An interrupt dispatcher component directs operations to the correct interrupt handler or interrupt service routine when an interrupt request name is utilized in a plurality of configurations. The interrupt dispatcher component analyzes the configuration of the system and forwards operation to the correct interrupt service routine for the particular configuration the system is configured in when the interrupt request is received. For example, the system may be configured in a first configuration (e.g. as a transmitter) when an interrupt request identifier (e.g., IRQ2) is received and a corresponding dispatcher component (e.g., interrupt dispatcher 294) forwards operations to an interrupt handler or service routine corresponding to the first configuration (e.g., a transmitter ISR). If the system is reconfigured (e.g., a talk button is released) for a second configuration (e.g., as a receiver) and the interrupt request identifier (e.g., IRQ2) is received, the corresponding dispatcher component (e.g., interrupt dispatcher 294) forwards operations to an interrupt service routine corresponding to the second configuration (e.g., a receiver ISR).

In one embodiment of the present invention interrupt states are tracked. A system can have several interrupt states. In one exemplary implementation, the interrupt states include a trigger waiting state, a pending state, a servicing state and a closure state. The trigger waiting state corresponds to waiting for an interrupt triggering event or condition. The pending state corresponds to an interrupt service request that is waiting to be serviced. The servicing state corresponds to an interrupt that is being serviced. The closure state corresponds to a notification that a service request has been serviced and a return of control for other system operations. In one embodiment of the present invention the interrupt states are stored in a dedicated register and the status of pending state interrupts is resolved during system reconfiguration.

In one embodiment of the present invention, indications of a pending interrupt state associated with a first configuration are deleted when the system is changed to a second configuration. For example, in a first interrupt scheme (e.g., associated with a first system configuration) an interrupt request (e.g., IRQ2) supports transmission functions and is in a pending state. A second interrupt scheme is invoked (e.g., by a system configuration change triggering event) wherein the interrupt request (e.g., IRQ2) supports a receiving function. Pending interrupt state information associated with the first interrupt scheme is deleted when the second interrupt scheme replaces the first interrupt scheme and the second configuration interrupt states are tracked.

The present invention is readily adaptable to a variety of mechanisms and processes for implementing the dynamic activation of different configuration images and interrupts. In one embodiment of the present invention, a first configuration image and a second configuration image include a copy of the same user program with appropriate interrupts. In another embodiment, a first configuration image and a second configuration image include pointers that point to a user program and relevant information from the user program is loaded into the configuration registers when the respective image is activated, including an appropriate interrupt vector table and interrupt service routines.

Figure 3A:
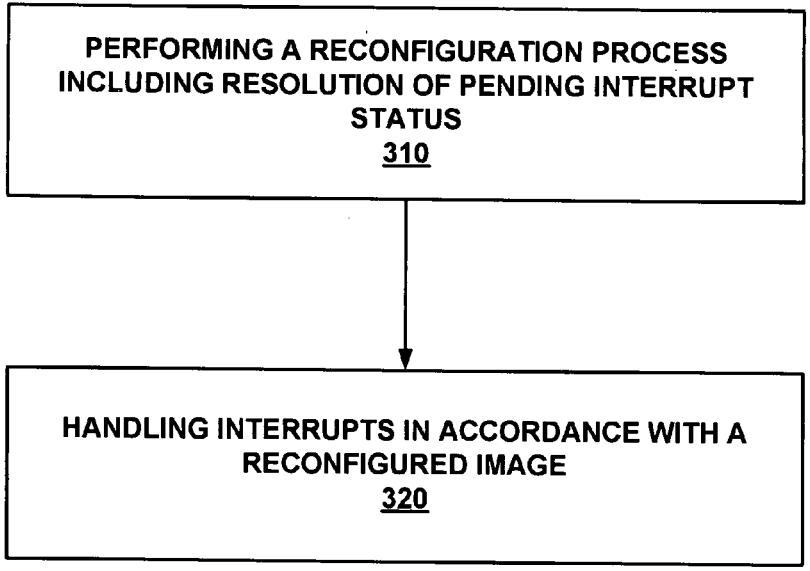
FIG. 3A is a flow chart of a dynamic interrupt reconfiguration method in accordance with one embodiment of the present invention.

FIG. 3A is a flow chart of dynamic interrupt reconfiguration method 300, one embodiment of the present invention. Dynamic interrupt reconfiguration method 300 facilitates dynamic assignment of interrupts for different configurations and functions. In one embodiment of the present invention, dynamic interrupt configuration method 300 utilizes a plurality of interrupt service routines loaded in a programmable electronic device memory to facilitate different interrupt priorities and implement different interrupt functionalities. In one embodiment of the present invention, dynamic interrupt reconfiguration method 300 facilitates configuration changes (e.g., reconfiguration) with smooth operational transitions ("on the fly") to efficiently and flexibly address differing interrupt requirements of end use applications.

In step 310, a reconfiguration process is performed including resolution of pending interrupt status. In one exemplary implementation of the present invention, different configuration images define different functions and configurations (e.g., transmitter, receiver, etc.) for components of a target programmable electronic device. Information from the first configuration image is automatically loaded into configuration registers in the target programmable electronic device in response to a first condition (e.g., a talk button is activated, at a particular time, etc.). The target programmable electronic device is reconfigured by automatically loading a second configuration image into configuration registers in response to a second condition (e.g., a talk button is not activated, at a different particular time, etc.). During reconfiguration the information from a second configuration image replaces the information associated with the first configuration image. Pending interrupt status indications associated with the first configuration are resolved (e.g., deleted).

In one embodiment of the present invention an indication of an interrupt state associated with an interrupt request identifier is tracked. The interrupt state provides an indication of the progress in processing an interrupt. In one exemplary implementation, the pending interrupt status indications associated with the first configuration are deleted during the reconfiguration process. In one exemplary implementation, the nature of the pending interrupt is analyzed and if it is relatively inconsequential (e.g., a small timing interrupt) the second configuration absorbs the consequences of letting the interrupt service routine complete (e.g., a small timing glitch is absorbed by the second configuration).

In step 320 interrupts in accordance with a reconfigured image are handled. In one embodiment of the present invention a multi-configuration interrupt resolution process is performed. An association is provided between an interrupt service routine or handler memory location based upon both an interrupt request identifier and a configuration image. In one exemplary implementation the association is provided by a dispatcher component. This association is utilized to resolve interrupts with interrupt request names that are utilized in multiple configurations.

Figure 3B:
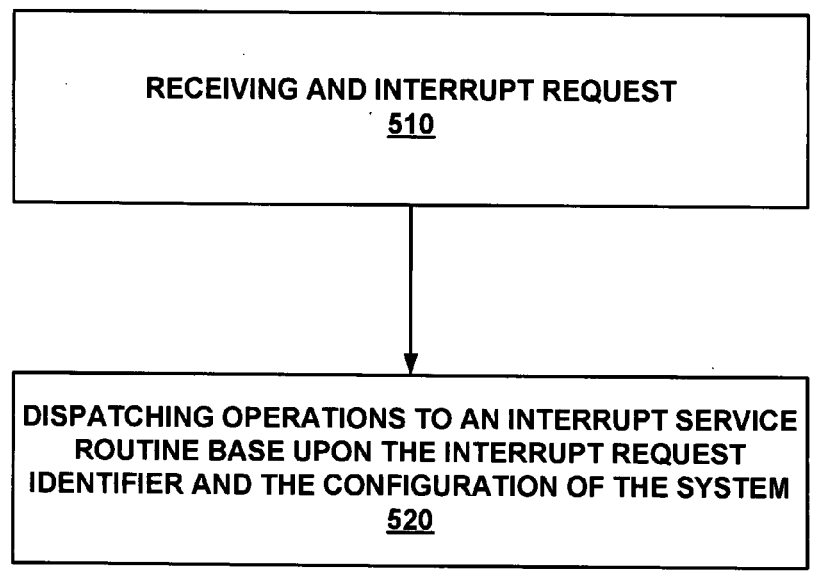
FIG. 3B is a flow chart of multi-configuration interrupt resolution process in accordance with one embodiment of the present invention.

FIG. 3B is a flow chart of multi-configuration interrupt resolution process 500, one embodiment of a present invention multi-configuration interrupt resolution process. In one embodiment of the present invention, a multi-configuration interrupt resolution process is performed on a programmable single-chip system or electronic device. In one exemplary implementation, a first configuration image and second configuration image of the system define different functions and configurations for components of the system. Interrupt requests have similar interrupt request identifiers but the configurations have different interrupt handlers associated with the different functions and configurations associated with those interrupt request identifiers. Multi-configuration interrupt resolution process 500 is performed as part of dynamic interrupt reconfiguration method 300 in one embodiment of the present invention.

In step 510 an interrupt request is received. The interrupt request is a request for a deviation from the normal flow of operations to handle special routines. The interrupts provide improved processing efficiency by resolving error conditions, (e.g., as a result of an instruction execution including arithmetic overflow, division by zero, illegal machine instruction, reference outside allowable memory, etc), fixing failure conditions (e.g., power failure or memory parity error), initiating regularly timed functions, and handling input/output operations (e.g., to signal completion of an input or output operation). For example, interrupts permit normal processing to proceed while other functions (e.g., an input/output function) are performed and when the results of the other functions are finished (e.g., the input/output results are returned), an interrupt of the normal routine permits those results to be included in the normal processing routine.

In step 520, operations are dispatched to an interrupt service routine based upon the interrupt request identifier and the configuration of the system. In one embodiment, an interrupt request (e.g., IRQ2) is dispatched to an ISR for a first configuration and after a reconfiguration is dispatched. to an ISR for a second configuration. For example, an interrupt request identifier (e.g., IRQ2) is received when a programmable system is in a first configuration (e.g., a transmitter) and operations are directed towards a transmission process in accordance with a first interrupt scheme (e.g., in a first configuration). The same interrupt request identifier (e.g., IRQ2) is received when the programmable system is in a second configuration (e.g., a receiver) and operations are directed toward a receiving process in a second interrupt scheme (e.g., in a second configuration). The definition or context of an interrupt request identifier or indicator (e.g., IRQ1, IRQ2, IRQ3, etc.) is resolved to appropriately correspond with a change in the configuration or functionality of a programmable system and the proper interrupt handlers or interrupt service routines are loaded.

Figure 4:
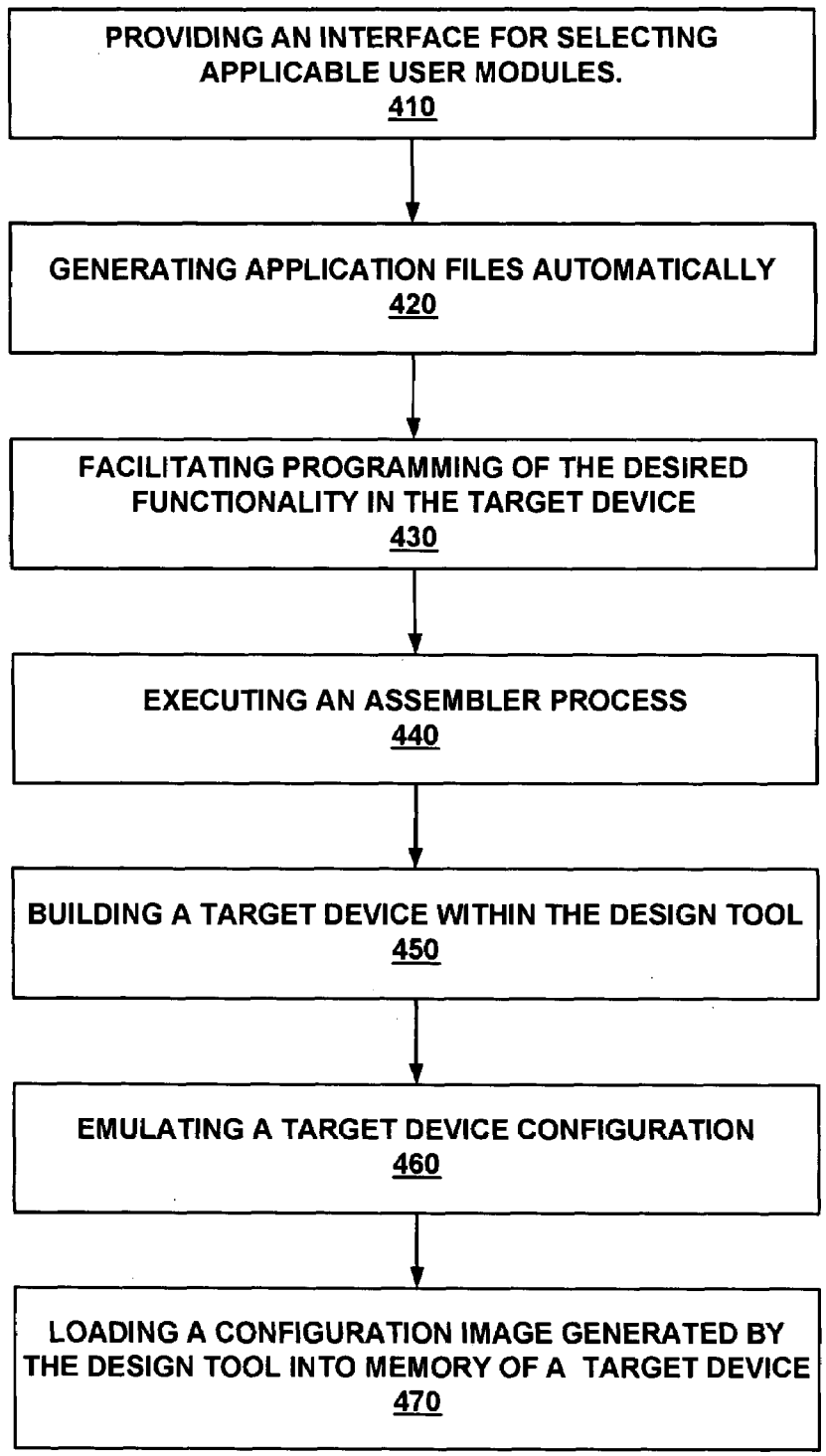
FIG. 4 is a flow chart of a design tool process illustrating exemplary steps used by a design tool in accordance with one embodiment of the present invention.

In one embodiment of the present invention, configuration images and assignment of interrupt service routines to the configuration images are provided by an electronic device design tool (e.g., a computer implemented software programmable integrated circuit design tool). FIG. 4 is a flow chart of design tool process 400 and illustrates exemplary steps used by a design tool in accordance with one embodiment of the present invention. Design tool process 400 facilitates configuration, programming, building, emulation and debugging of a customized programmable electronic device (a "target device") and interrupts associated with its various configurations. In one exemplary implementation the programmable electronic device is similar to integrated circuit 10 of FIG. 1 with a functional component 25 similar to FIG. 2A. Additional details on an exemplary implementation of a present invention design tool are set forth in co-pending commonly-owned U.S. patent application Ser. No. 09/989,570 filed Nov. 19, 2001, entitled "METHOD FOR FACILITATING MICROCONTROLLER PROGRAMMING", which is hereby incorporated by this reference, and U.S. patent application Ser. No. 09/989,819 filed Nov. 19, 2001, entitled "A SYSTEM AND METHOD FOR CREATING A BOOT FILE UTILIZING A BOOT TEMPLATE", which is also hereby incorporated by this reference.

In one embodiment, design tool process 400 is carried out by a computer system under the control of computer-readable and computer-executable instructions directed at implementing design tool process 400. One embodiment of an exemplary computer system utilized to implement design tool process 400 is set forth in incorporated U.S. patent application Ser. No. 09/989,570 filed Nov. 19, 2001, entitled "METHOD FOR FACILITATING MICROCONTROLLER PROGRAMMING". The computer-readable and computer-executable instructions reside, for example, in data storage features of the computer system such as a computer usable volatile memory, computer-usable non-volatile memory and/or data storage device. The computer-readable and computer-executable instructions direct the computer system operation (e.g., a processor) in accordance with design tool process 400.

In step 410, an interface for user interaction is provided. In one embodiment of the present invention, the interface is provided for selecting applicable "user modules" (e.g., a preconfigured function that may be based on more than one functional block) and associating interrupt service routines with the user modules. In one exemplary implementation, a user module when programmed and loaded on a memory of the programmable electronic device directs a functional block to work as a peripheral on the target device. At any time in design tool process 400, user modules and associated interrupts may be added to or removed from the target device. The selected user modules are associated with (e.g., "placed" or "mapped to") representations of programmable electronic device blocks defined in the design tool. Once a user module is associated with a representation, its parameters and interrupts can be viewed and modified as needed. Global parameters used by a plurality of user modules (for example, CPU clock speed) can also be set. In one embodiment of the present invention, interconnections between selected user modules are specified (e.g., either as each user module is placed or afterwards). The pin-out for each functional block can also be delineated, making a connection between the software configuration and the hardware of the target device.

In one exemplary implementation of the present invention, different configuration images define different functions and configurations for components of a target device. In one embodiment of the present invention, two different configuration images include copies of the same user code and in an other embodiment of the present invention two different configuration images include a "call" to the same user code. In one embodiment of the present invention, each configuration image includes information associated with selections of user modules for each one of the plurality of configuration images, allocations of hardware resources of the programmable integrated circuit to the selected user modules, parameterizations for the selected user modules, and connections between the selected user modules and to other programmable integrated circuit components (e.g., external pins).

In step 420, application files are automatically generated based upon selected user modules and interrupt service routines. When application files are generated, existing assembly-source and C compiler code are updated for device configurations. In one embodiment of the present invention application program interfaces (APIs) and interrupt service routines (ISRs) are generated. In one embodiment the application files include instructions for dispatching operations to an appropriate interrupt service routine when an interrupt service request indicator utilized in multiple configurations is received.

In step 430, programming of the desired functionality into the target device is facilitated. In one embodiment of the present invention, source code files can be edited, added or removed. In one embodiment of the present invention, programmable configuration of external programmable integrated circuit ports is also facilitated by design tool process 400.

In step 440, an assembler process is executed. The assembler operates on an assembly-language source to produce executable code. This code is compiled and built into an executable file. In one embodiment of the present invention, the executable file is downloaded into an emulator, where the functionality of the target device is emulated and debugged.

In step 450 the target device is "built" within the design tool. Building the target device in the design tool includes linking the programmed functionalities of the source files (including device configuration). In one exemplary implementation of the present invention, the linked programmed functionalities and the source files are downloaded to an emulator for debugging in step 450.

In step 460, the target device is emulated using an in-circuit emulator for debugging. The emulator allows the target device to be tested in a hardware environment while device activity is viewed and debugged in a software environment.

In step 470 a configuration image and associated interrupt handlers with instructions for dispatching operations to appropriate interrupt routines generated using design tool process 400 are loaded into memory of a target device. In one embodiment of the present invention a plurality of configuration images and associated interrupt handlers are loaded into memory of a target device. Interrupt dispatcher instructions are also loaded in the target device. The interrupt dispatcher instructions provide an association between both an interrupt service request and a configuration image to an interrupt service routine.

Although specific steps are disclosed in design tool process 400 of FIG. 4, such steps are exemplary. That is, the present invention is well suited to use with various other steps or variations of the steps recited in process 400. Additionally, for purposes of clarity and brevity, the discussion is directed at times to specific examples. The present invention design tool process 400, however, is not limited solely to use to design a particular target device (e.g., a programmable integrated circuit, electronic device and/or microcontroller). Instead, the present invention is well suited to use with other types of computer-aided hardware and software design systems in which it may be necessary to accomplish a multitude of tasks as part of an overall process directed at designing an electronic device.

In one embodiment of the present invention, a design tool process (e.g., design tool process 400) is utilized to create an electronic device programming method. For example, an electronic device programming method includes selecting a set of user modules for a first circuit design system from a plurality of user modules. Hardware resources of the electronic device are allocated to the set of user modules which are then parameterized. The set of user modules are connected together and to external pins of the electronic device. A first configuration image is generated based on a user source program and based on information from the preceding step and the configuration image is loaded into the electronic device. An interrupt service routine vector allocation associated with the first configuration image is also loaded into the electronic device. The process is repeated for a second circuit design system to produce a second configuration image.

In one embodiment a first configuration image and associated interrupt information are downloaded into a memory space of the electronic device. A second configuration image and associated interrupt information are downloaded into another memory space of the electronic device. The first configuration image and associated interrupt information are made active in the electronic device to realize a first circuit design system. The second image and associated interrupt information are made active in the electronic device in response to a condition facilitating dynamic realization of a second circuit design system. The electronic device can be a programmable microcontroller comprising programmable analog and digital resources.

Thus, the present invention provides convenient and efficient dynamic configuration of an electronic device (e.g., a programmable integrated circuit). An electronic device design of the present invention facilitates dynamic programmability that enables operationally smooth (e.g., "on the fly") changes in the configuration and/or functionality of the electronic device with minimal or no disruptions to device operations. The present invention allows utilization of the same components to perform different functions and take on different configurations that are capable of satisfying the requirements of different applications. A variety of functions and configurations may be implemented with less resources than traditional systems. The present invention does not require duplicative resources (e.g., circuit components) for dedication to the performance of different functions or configurations. A present invention dynamically programmable device design also facilitates utilization of device components that would otherwise be operationally idle.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A circuit comprising:
   a microprocessor for processing data;
   a programmable functional component coupled to said microprocessor, wherein said programmable functional component includes a plurality of functional blocks programmable to provide a plurality of functions and configurations; and
   a memory for storing data and instructions including interrupt handlers and instructions on dispatching operations to an appropriate interrupt handler for each one of said plurality of functions and configurations, said memory coupled to said microprocessor.

2. The circuit of claim 1, wherein said programmable functional component includes:
   a programmable interconnect for coupling components to a bus for communicating data;
   an analog functional block configurable to perform analog functions, said analog block coupled to said programmable interconnect; and
   a digital functional block configurable to perform digital functions, said digital block coupled to said programmable interconnect.

3. The circuit of claim 1 wherein said memory includes an interrupt vector table that provides an association between interrupt request names and interrupt resolution indications corresponding to interrupt dispatcher components which provide a reference to an appropriate interrupt handler for a particular configuration.

4. The circuit of claim 3 wherein said interrupt request names are not unique and are used in multiple configurations.

5. The circuit of claim 3 wherein said interrupt dispatcher component analyzes the configuration of said circuit and forwards operation to the correct interrupt service routine for the particular configuration the circuit is configured in when the interrupt request is received.

6. The circuit of claim 1 further comprising a programmably configurable external communication port for communicatively coupling with external devices.

7. The circuit of claim 1, wherein said memory stores a plurality of configuration images and interrupt service routine information associated with each of said plurality of configuration images, wherein said configuration images define the configuration and functionality of said circuit.

8. The circuit of claim 7, wherein said circuit is automatically reconfigured by activating different ones of said plurality of configuration images and associated interrupt service routine handlers based upon the existence of a predetermined condition or event.

9. The circuit of claim 7, wherein said configuration images comprise:
   user module personalization data for defining the functionality and configuration of a component included in said circuit;
   parameterization data for defining parameters for said component;
   application program interface (API) information for defining an operation of said component;
   interrupt service routine information for handling interrupts associated with said configuration image; and
   user code for defining functionality of said component.

* * * * *